Dec. 16, 1969  F. B. MOUNTJOY ET AL  3,484,665
ELECTRICAL SHOCK DEVICE FOR REPELLING SHARKS
Filed April 26, 1967  6 Sheets-Sheet 1

INVENTORS
FRANK B. MOUNTJOY
RICHARD ORMSBY

BY LeBlanc + Shur

ATTORNEYS

Dec. 16, 1969  F. B. MOUNTJOY ET AL  3,484,665
ELECTRICAL SHOCK DEVICE FOR REPELLING SHARKS
Filed April 26, 1967  6 Sheets-Sheet 3

INVENTORS
FRANK B. MOUNTJOY
RICHARD ORMSBY

BY LeBlanc & Shur

ATTORNEYS

Dec. 16, 1969  F. B. MOUNTJOY ET AL  3,484,665
ELECTRICAL SHOCK DEVICE FOR REPELLING SHARKS
Filed April 26, 1967  6 Sheets-Sheet 5

INVENTORS
FRANK B. MOUNTJOY
RICHARD ORMSBY

BY *LeBlanc + Shur*

ATTORNEYS

United States Patent Office 3,484,665
Patented Dec. 16, 1969

3,484,665
ELECTRICAL SHOCK DEVICE FOR REPELLING SHARKS
Frank B. Mountjoy, 9300 Van Buren St., Lanham, Md. 20801, and Richard Ormsby, 9623 Wellington St., Seabrook, Md. 20801
Filed Apr. 26, 1967, Ser. No. 633,864
Int. Cl. H05c 1/00
U.S. Cl. 317—262  17 Claims

ABSTRACT OF THE DISCLOSURE

Disclosed is an electrical shocking device for warding off dangerous animals and particularly fish. It is especially designed for underwater use and may be mounted on the end of a spear gun for use by scuba divers to repel sharks. The unit is water tight and provided with small, sharp pointed electrodes insulated almost to their very tips to insure that the full force of the electric shock passes through the body of the fish and is not shorted out in the water.

---

The present invention relates to an electric shock device for repelling fish and more particularly to a waterproof electronic protector for warding off attacks of sharks and other dangerous fish or underwater mammals by means of an electric shock. It is particularly suited for use by skin divers and other underwater swimmers but also is useful by persons in small boats, life boats, rafts, and the like.

As is well known, sharks constitute a significant hazard to human life, and are an ever present danger in certain waters to underwater swimmers and particularly to those fishing under water with spear guns. While various shark repelling devices and compounds have been proposed, insofar as applicants are aware, none has been found to be completely satisfacory in protecting from sharks. Sharks are large, strong fish and, as a consequence, are difficult to ward off with most conventional hand weapons usable in the water. Furthermore, severely wounding or killing a shark, as with spear gun, has the serious disadvantage that it produces a lot of blood in the water which only tends to attract more sharks and in some cases, increases the danger from shark attack to the swimmer.

The present invention avoids the above-mentioned and other difficulties by providing a small hand weapon for warding off sharks and other underwater species without severely wounding the fish and without drawing any significant amounts of blood which might otherwise tend to attract others. The device of the present invention is an electrical shocking unit for imparting a substantial shock to the fish so as to keep him at a safe distance from the swimmer. It is adapted to be used either alone or in conjunction with a conventional spear gun and is provided with a suitable bracket for attaching it to the end of a spear gun. An important feature of the present invention includes the provisioin of sharp pointed electrodes insulated almost down to their very tips which penetrate the skin or scales of the fish to insure that the electric charge passes through the body of the fish and is not shorted out in the water. At the same time, the small sharp points draw very minimal amounts of blood from fish so that other undesirable or dangerous fish are not attracted by excessive bleeding. The electrical unit is completely encased and sealed against the entrance of water and is particularly adapted for use on the end of a spear gun so that a substantial distance may be maintained between the swimmer and the fish when the shark repeller is used.

While particularly designed for use against sharks, the fish repeller of the present invention may be used for protecting against other fish and animals where desired. For example, it has been found quite useful in fresh water caves in protecting the swimmer from large catfish. While these fish do not ordinarily attack swimmers. they have sharp barbs which, as the fish are frightened out of an underwater cave, an cause painful injury by brushing up against a swimmer as the fish leaves the cave when the swimmer enters. The fish repeller is also usable outside of the water to ward off wild animals such as bears or the like which are known on occasion to attack human beings.

The basic repeller unit of the present invention comprises a water tight housing in which is mounted a spark coil energized from a suitable source of dry cell batteries carried within the housing. The spark coil produces a high voltage electrical discharge across a pair of sharp pointed contacts which penetrate the skin or scales of a fish. The size of the batteries and other electrical componets are preferably such that the shark receives a substantial electrical shock but one which is not fatal to the fish. The unusual nature of the shock coupled with its unpleasantness to the fish will cause him to swim away, but without any serious damage and only very slight wounds. The contacts are insulated down to within approximately $\frac{1}{32}$ of an inch from their very tips to insure that the discharge will pass through the body of the fish and little, if any, is shorted out through the water. The tips are preferably small and very sharp so that they penetrate the fish but, at the same time, make only small wounds which do not bleed to any significant extent. Also incorporated is a relay so that the repeller may be remotely energized. This makes it possible to mount the repeller on an end of a spear gun several feet from the trigger while, at the same time, permitting the swimmer to actuate the repeller from the handle of the spear gun. The entire unit may be energized from power supply package strapped to one of the air tanks on the back of a scuba diver or may, alternatively, be secured to the diver's waist. Modified embodiments of the present invention include a removable handle for forming a pistol-like, hand-held unit as well as a device wherein the fish repeller is incorporated directly into the body of a spear gun rather than simply attached to its end.

It is therefore one object of the present invention to provide an improved electric shocking unit for warding off fish and animals.

Another object of the present invention is to provide a completely sealed electric shocker for underwater use to ward off sharks and other undesirable underwater species.

Another object of the present invention is to provide an underwater shocking fish repeller which insures that the electrical discharge passes through the body of the fish and is not shorted out in the water.

Anoher object of the present invention is to provide shocking device adapted to penetrate the hide or scales of a fish without severely wounding the fish and producing any significant bleeding from the wounds.

Another object of the present invention is to provide an electric shocking fish repeller having small, sharp, electrical contacts insulated almost down to their very tips.

Another object of the present invention is to provide an electrical shock-type fish repelling device particularly adapted for use by a skin or scuba diver and including provision for attaching the repeller to the end of a spear gun. The basic unit of the present invention may be attached to the spear gun, incorporated in it, and additionally is provided with a separate handle so that it may be used independently of the spear gun as a hand held pistol type weapon.

These and further objects and advantages of the invention will be more apparent upon reference to the following specification, claims, and appended drawings wherein:

Figures 1, 2, 5:
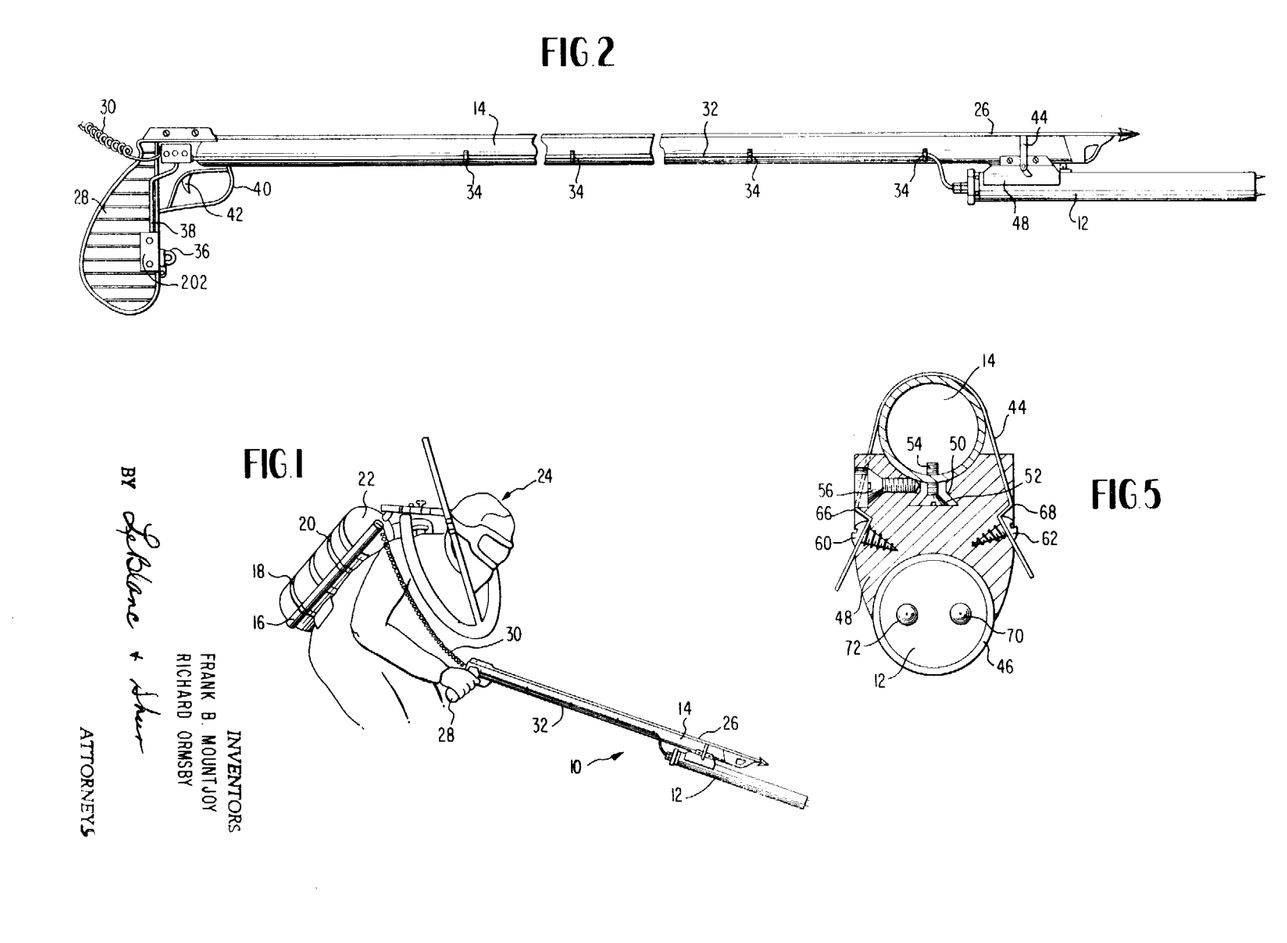
FIGURE 1 is a pictorial view showing the fish repelling device of the present invention as carried by a scuba diver on the end of a spear gun.
FIGURE 2 is an enlarged, elevational view showing the spear gun of FIGURE 1 and the manner of attachment of the fish repeller of the present invention to its end.
FIGURE 5 is a sectional view showing the manner of attaching the repeller unit to the end of a spear gun.

Referring to the drawings and particularly to FIGURE 1, the fish repeller of the present invention, generally denoted at 10, comprises a repeller unit 12 mounted as a water tight compartment on the end of a conventional spear gun 14, and a water tight power supply unit 16 mounted by straps 18 and 20 to one of the air tanks 22 on the back of a scuba diver generally indicated at 24. Spear gun 14 carries the conventional spear 26, and is provided with a handle 28 forming a pistol-type grip by means of which it may be carried and triggered to fire the spear 26. Power supply unit 16 is electrically connected to the spear gun handle 28 by a power cable 30. This cable, illustrated to an enlarged scale in FIGURE 3 in the preferred embodiment, comprises five feet of insulated coiled wire and carries four strands of wire for a purpose more fully described below. The handle is, in turn, connected to the repeller unit 12 by means of a two-wire cable 32. This cable runs along side of the spear gun and is fastened to it by a plurality of mounting brackets 34, as illustrated in FIGURE 2.

Referring to FIGURE 2, the handle 28 of the spear gun is provided with an auxiliary trigger and electrical switch 36 adapted to be actuated by one of the scuba diver's smaller fingers which normally grasp the handle 28. This auxiliary trigger or switch is electrically connected to the power supply cable 30 by a two wire cable 38 extending upwardly along the side of the handle. The spear gun includes the conventional trigger guard 40 and trigger 42 adapted to be actuated by the index finger of the scuba diver in a conventional manner to fire the spear 26.

Figure 4:
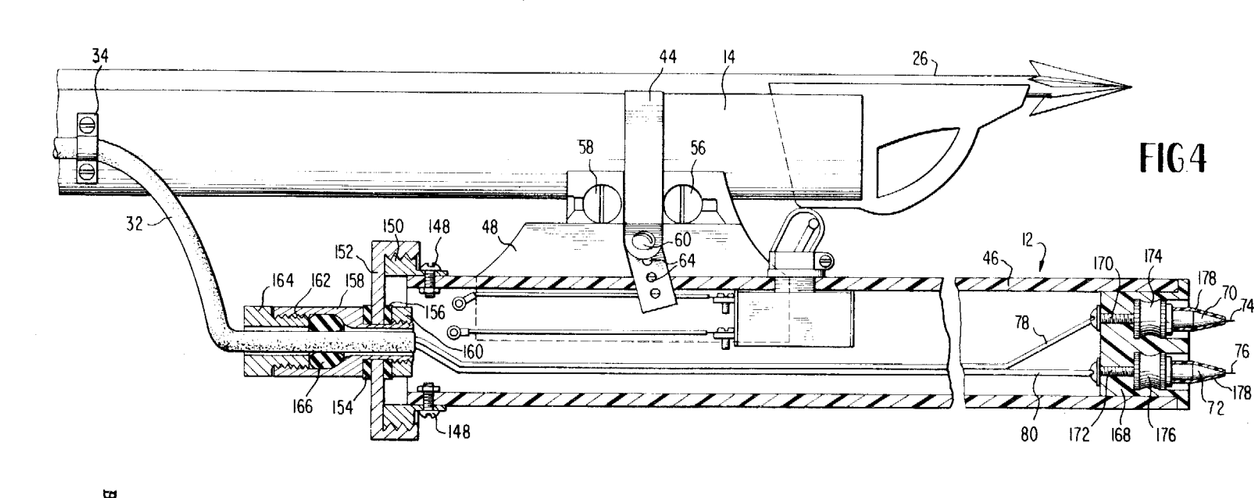
FIGURE 4 is an enlarged, elevational view with parts in section, showing the repeller unit as mounted to the end of the spear gun of FIGURES 1 and 2.

Repeller unit 12 is attached to the forward end of the spear gun 14 by a tongue-in-groove connection and a reinforcing metal band 44 in a manner more clearly illustrated in FIGURES 4 and 5. Referring to those figures, repeller unit 12 is enclosed in a waterproof housing 46 which had rigidly secured to it or formed integrally with it, a mounting block 48. Mounting block 48 is formed with an elongated, dove-tailed groove 50 best seen in FIGURE 9 adapted to mate with a tongue 52 attached to the spear gun 14 by a plurality of screws 54 threadedly received in suitable threaded apertures formed in the underside of the spear gun. Mounting block 48 is locked in place by a pair of set screws 56 and 58 which are threaded into the side of the mounting block and bear against an undercut side of the tongue 52. This connection is reinforced by the metal band 44 looped over the top of the spear gun (passing beneath the spear 26), and secured to the mounting block at each end by screws 60 and 62. The ends of the metal band are apertured as at 64 in FIGURE 4 to pass one of the screws 60 or 62 which are, in turn, threaded into the mounting block 48. The wire band 44 preferably passes over a pair of projections or ledges 66 and 68 so that, as screws 60 and 62 are tightened down, they stretch the metal band over these projections or ledges formed in mounting block 48. This insures that the metal band will tightly engage the spear gun and tightly hold the repeller unit 12 to it.

Figure 12:
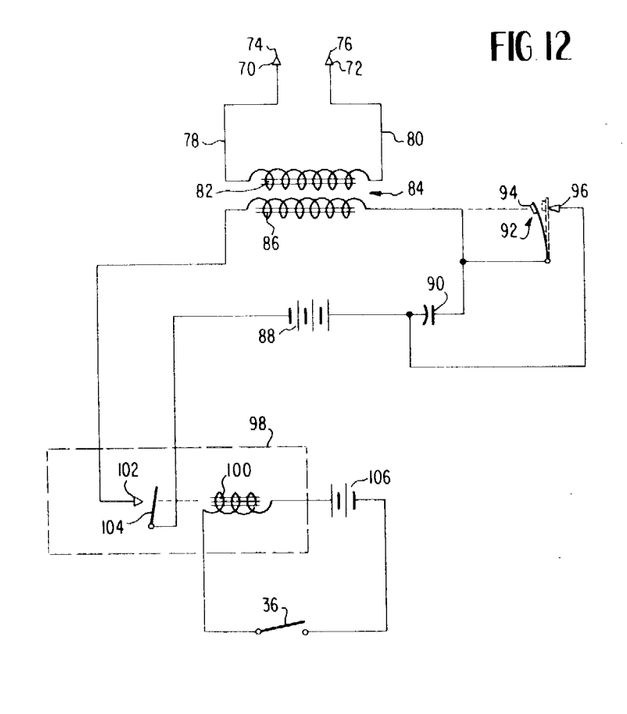
FIGURE 12 is a circuit diagram of the electrical shock-type fish repelling device of the present invention.

Referring to FIGURE 12 showing the electrical circuit for the system, the high voltage discharge occurs between a pair of sharpened electrodes or contacts 70 and 72 which are sufficiently sharp to penetrate through the hide or scales of a fish so that the discharge between the tips 74 and 76 of the electrodes pass through the body of the fish. These electrodes are connected by way of leads 78 and 80 to the opposite ends of secondary winding 82 of a voltage step up transformer 84. The secondary winding 82 of a voltage step up transformer 84. The secondary 82 of transformer 84 is coupled to the transformer primary winding 86 such that the voltage developed across the secondary winding 82 is substantially increased over the voltage on primary 86. That is, secondary 84 contains a much greater number of windings that primary 86 to step up the voltage across the transformer.

Transformer 84 is energized from a power supply indicated at 88 in FIGURE 12 which preferably consists of one or more dry cell batteries housed in the power supply unit 16 of FIGURE 1. The positive side of the power supply 80 is connected to a capacitor 90 in parallel with a mechanical vibrator 92. Opening and closing of the contacts 94 and 96 of the vibrator, in conjunction with the charge developed on capacitor 90, acts to produce a high voltage discharge through the fish across sharpened electrodes 70 and 72 in a well known manner.

For remote actuation from the handle of a spear gun, the unit is also provided with a relay indicated by the dashed box 98 in FIGURE 12, including relay coil 100, stationary contact 102, and movable relay contact 104. The relay is actuated from a power supply 106 again preferably formed from one or more dry cell batteries such as batteries 85 and 87 in FIGURE 3. The relay is closed when energized upon actuation of the trigger or switch 36 mounted on the handle of the spear gun.

Figure 3:
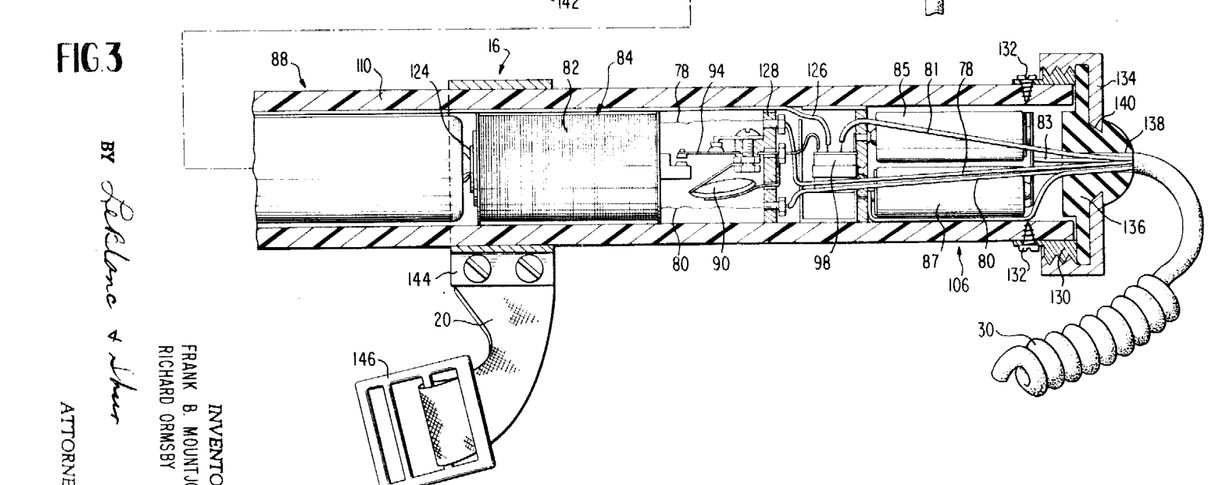
FIGURE 3 is a further enlarged, elevational view, with parts in section, of the power supply package of FIGURE 1 adapted to be attached to one of the scuba diver's air tanks.

Referring to FIGURE 3, the power supply unit 16 comprises a tubular casing 110 made of plastic or other corrosion resistant, electrically insulating material in which are mounted a plurality of dry cells 112, forming the power supply 88. Attached by the screws 114 to one end of the tubular casing 110, is an externally threaded adapter 116. Threaded over the adapter 116 is an end cap 118 which acts to compress a resilient rubber, or the like, gasket 120 against the end of the tubular housing to form a water tight seal. Bearing against the electrically insulating gasket 120, is one end of a coil spring 122 whose other end makes electrical contact with one end of one of the dry cells 112. Tightening down of the cap 118 acts to slightly compress spring 122 so as to form good electrical contact with one end of one of the dry cells 112. Tightening down of the cap 118 acts to slightly compress spring 122 so as to form good electrical contact and to hold the batteries against excessive movement within the casing.

The other end of the power supply 88 in FIGURE 3, i.e., the right hand end of the right most dry cell 112, bears against an electrical contact 124 and this is connected by a suitable lead (not shown) to the stationary contact 96 of vibrator 92. One end of a lead 126 is soldered or otherwise suitably electrically connected to the conductive spring 122 and connects the other side of the power supply 88 to the relay 98. This lead 126 is illustrated in FIGURE 3 as extending along the inner surface of the tubular casing adjacent the dry cells 112. The primary of transformer 84 is surrounded by the secondary winding 82 illustrated in FIGURE 3. Output from the secondary is taken by way of leads 78 and 80 which pass through an electrically insulating support and spacer generally indicated at 128 to enter the power cable 30.

The other end of the tubular casing 110 is provided with a similar externally threaded adapter 130 attached to the casing by screws 132. Threaded over the adapter 130 is a second end cap 134 which bears against a resilient and electrically insulating gasket 136 so that the gasket is pressed into water tight sealing engagement with this end of the tubular casing. Gasket 136 is provided with a central aperture 138 which sealingly engages one end of the power cable 30. Gasket 136 is undercut as at 140 to receive an annular projection formed in end cap 134 so that the gasket seal will not be broken by normal pulls on the power cable 30. Dry cells 85 and 87 form the power supply 106 for actuating the relay 98.

Attached to the casing or housing 110 of the power supply unit 16, are a pair of brackets 142 and 144 to which are secured the belts 18 and 20 of FIGURE 1. The belts may be provided with suitable buckles such as that indicated at 146 in FIGURE 3 by means of which the power supply unit 16 is attached to air tank 22 in FIGURE 1.

Referring to FIGURES 4 and 5, one end of casing 46 of the repeller unit 12, which casing is similarly formed of suitable plastic or other corrosion resistant insulating material, has connected to it by bolts 148, an externally threaded adapter 150 threadedly receiving an end cap 152. On opposite sides of the cap 152 are rubber sealing washers 154 and 156. Passing through the end cap and washers is the threaded hollow end of an adapter 158 clamped to the end cap washers by a nut 160. The other end of adapter 158 is internally threaded as at 162 and forms a waterproof female receptacle for receiving the mating externally threaded male connector 164 through which passes power cable 32. A rubber O-ring seal 164 is compressed between connector 164 and adapter 158. The connector and adapter compress O-ring 164 to form a water tight connection for underwater use through which wires 78 and 80 in cable 32 pass to the interior of repeller casing 46.

Leads 78 and 80 for cable 32, pass through the casing 46 and transfer electrical current to the sharpened electrodes 70 and 72. These electrodes are mounted in an insulating end cap 168 which seals off the other end of casing 46 and which may be received in the casing with a press fit, adhesively coupled to it or otherwise suitably secured in sealing engagement with casing 46. The ends of leads 78 and 80 are connected to screws 170 and 172 which are threaded at their other ends into metal bushings 174 and 176. Bushings 174 and 176 are embedded in the plug 168 and threaded into their other ends, are the contacts or electrodes 70 and 72. In this way, the electrodes are readily removable for replacement or repair.

An important feature of the present invention resides in the fact that the electrodes 70 and 72 are insulated almost to their very tips 74 and 76. In the preferred embodiment, the electrodes are almost completely covered with a coating 178 of a suitable electrically insulating material so that only the tips 74 and 76 are bare metal exposed to the water environment. The coating may be of any suitable electrical insulating resin but, in the preferred embodiment, comprises a conventional insulating shellac which terminates approximately $\frac{1}{32}$ of an inch from the tips of the electrodes. The thickness of the coating is exaggerated in the drawings for the sake of clarity. In the preferred embodiment, the overall length of the electrodes is 1½ inches and they are made of electrically conductive metal approximately ⅛ inch in diameter. For example, they may be No. 32 size brass screws threaded at the base for insertion in the bushings 174 and 176. The tapered portion of the electrodes, which is the only portion projecting from the end of the plug 168, is preferably about ¾ inch long. In general, it is not desirable to leave more than ⅛ inch of the points uncoated and, as indicated above, the uncoated metal extends preferably for only about $\frac{1}{32}$ of an inch at the extreme sharpened end of the electrodes.

In order to avoid excessive wounding of the fish, it is desirable that the electrodes be of relatively small diameter such that the electrodes have a ¼ inch maximum diameter at the base and taper outwardly to the tips. It is apparent that not only the bare metal tips, but a substantial part of the tapered portion of the electrodes, coated with insulating material, penetrate into the fish. This insures that the electrical discharge between the uncoated tips 74 and 76 is almost all concentrated within the body of the fish and little or no electrical current is shorted out through the water once the electrodes have been embedded. Thus, the fish receives the full shock of substantially the entire current flow between the electrodes. For the sake of clarity, the electrodes are illustrated in FIGURE 4 as vertically spaced but it is understood that in the preferred embodiment, they are in horizontal or side-by-side alignment as illustrated in FIGURE 5. They may, of course, be vertically aligned if so desired.

Figures 6, 8:
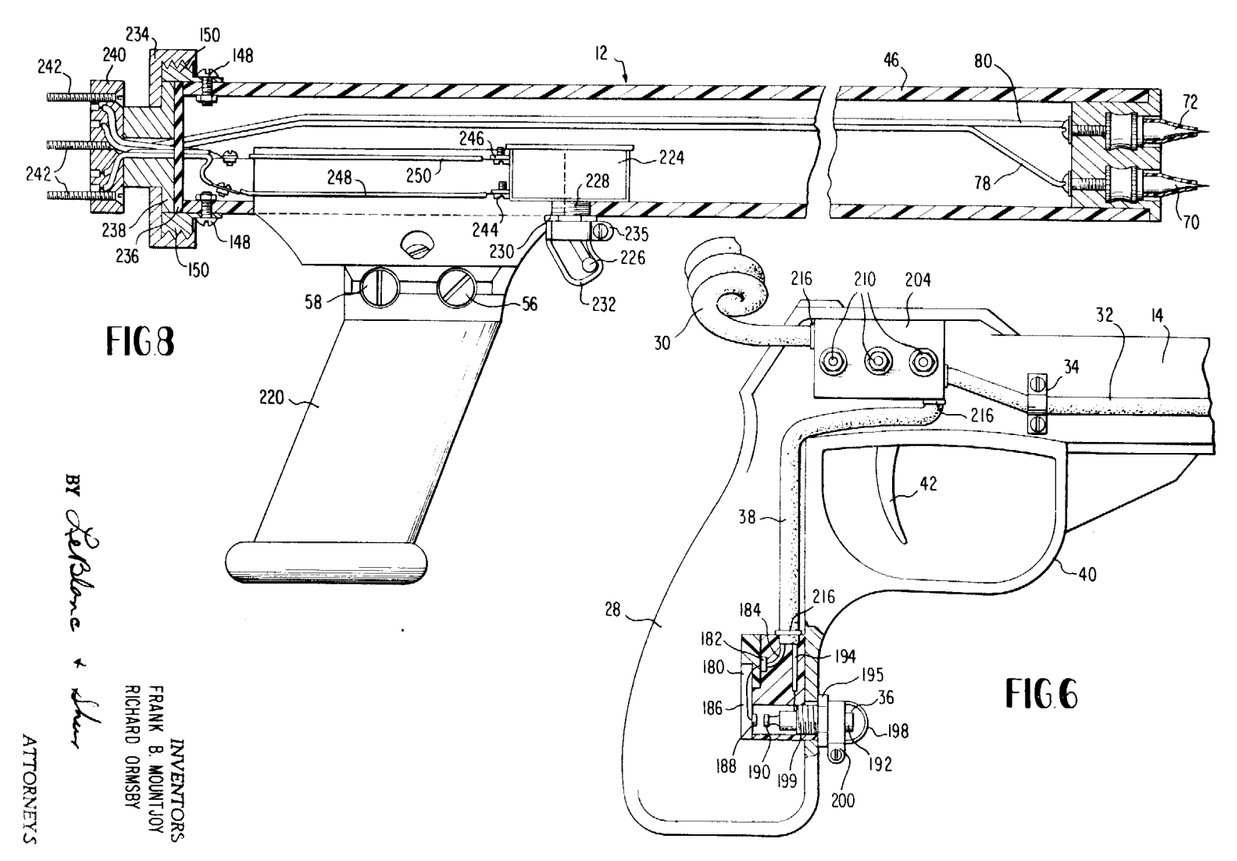
FIGURE 6 is an enlarged view with parts in section showing the handle of the spear gun and the auxiliary trigger mechanism incorporated in it for actuating the fish repeller of this invention.
FIGURE 8 is an elevational view, with parts in section, showing the repeller unit of the present invention mounted on a handle to form a pistol-type, hand-carried weapon.

FIGURE 6 illustrates the manner in which the power cable 30 is connected to the manually actuated switch or auxiliary trigger 36 on the handle 28 of the spear gun. Suitably mounted in a recess in the handle 28 is a switch housing 180 in which is mounted terminal 182 which connects one wire 184 of cable 38, by way of lead 186, to a stationary switch contact 188. Movable contact 190 of the switch is carried on a plunger 192 which extends outwardly of the handle where it may be depressed by the third or fourth finger of a scuba diver's hand to complete the circuit between contacts 188 and 190 of the switch. This completes the circuit from wire 184 to the other wire 194 to energize relay 98 contained in the power supply unit on the scuba diver's back. Plunger 192 is resiliently mounted in a sleeve 199 threaded into the spear gun handle and secured by nut 195. Water tight operation is obtained by enclosing the plunger in a flexible water tight envelope 198 secured to the sleeve by clamp 200. Thus, the scuba diver's finger never actually touches the plunger but depresses rubber envelope 198 against the plunger, at all times maintaining a water tight seal with the sleeve and handle so that water never gains access to the interior of switch housing 180. Access may be had to the switch by removing the cover plate 202 illustrated in FIGURE 2, which is screwed to the switch housing 180 over a water tight sealing gasket.

Figure 7:
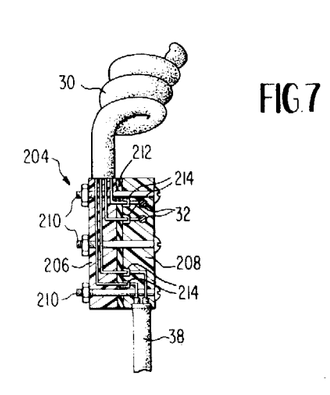
FIGURE 7 is a cross section showing the manner of wiring the power cable to the spear gun handle.

FIGURE 7 illustrates the electrical connection between the power cable 30, switch cable 38 and electrode cable 32. These connections are effected by means of a connector 204 mounted on the side of the spear gun in any suitable manner and illustrated in more detail in FIGURE 7. Connector 204 comprises a pair of insulating plates 206 and 208, joined by three bolts 210, to compress, between them, rubber gasket 212. The incoming leads from the power cable 30 plug in to suitable sockets 214 in insulating plate 208 and the intermediate gasket 212 insures a water tight seal of this connection. Preferably all cable junctions are surrounded by sealing compound as are the junctures of the switch and plates as indicated at 216 in FIGURE 6.

Figure 9:
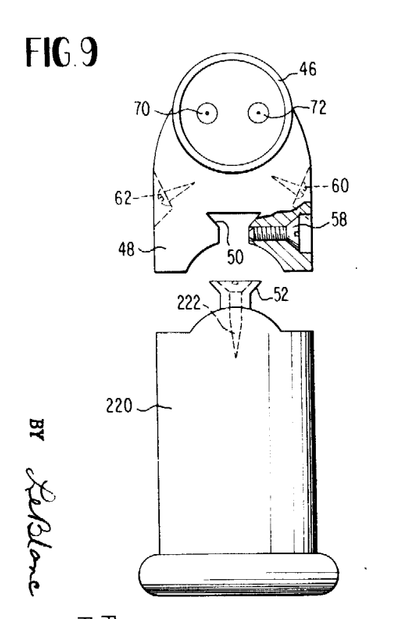
FIGURE 9 is a rear view of the repeller and handle of FIGURE 8 showing the manner of attaching the handle to this unit.

FIGURES 8 and 9 show the repeller unit 16 as modified and provided with a handle 220 to form a pistol-like hand-weapon. A plurality of screws 222 connect the tongue 52 to the handle 220 and the tongue is attached to the mounting block 48 by screws 58 and 56 in the manner previously described. Electric current is supplied by way of leads 78 and 80 to the electrodes 70 and 72 which operate in the identical manner as described in conjunction with the previous figures of the drawings.

For actuation of the piston unit of FIGURES 8 and 9, casing 46 has incorporated in it, a switch 224 actuated by a trigger-like lever 226 projecting outwardly of the casing 46 adjacent handle 220. The lever 226 is coupled to switch 224 through a threaded sleeve 228 secured to the casing 46 by nut 230. A water tight rubber or flexible envelope 232 surrounds the switch lever or trigger 226 and is attached to the sleeve by a clamping bracket 235. Again, the operator's finger never actually touches the lever 226 but flexes the envelope 232 against the lever to actuate it so that water never gets past the envelope 232 into the interior of the unit.

Threaded onto the end of casing 46 over adapter 150, is a cap 234 which presses sealing gasket 236 into water tight engagement with the end of the tubular casing 46. Between cap 234 and gasket 236, is clamped a flange 238 of a female plug 240. This plug is adapted to mate with a corresponding male plug to establish electrical connection to the four wire power cable 230 previously described. The connection is identical to that illustrated in FIGURE 7 wherein the male and female plates or plugs of the connector are clamped together by bolts 242 and press an intermediate rubber sealing gasket between them to insure a water tight connection.

Switch 224 is provided with terminals 244 and 246 and leads 248 and 250 which connect to the relay control wires 81 and 83 of FIGURE 3, passing through cable 30. As before, the relay 98 is actuated when trigger 226 in FIGURE 8 is pulled by the index finger of the operator from dry cells 85 and 87 forming the relay power supply 106.

Figure 10:
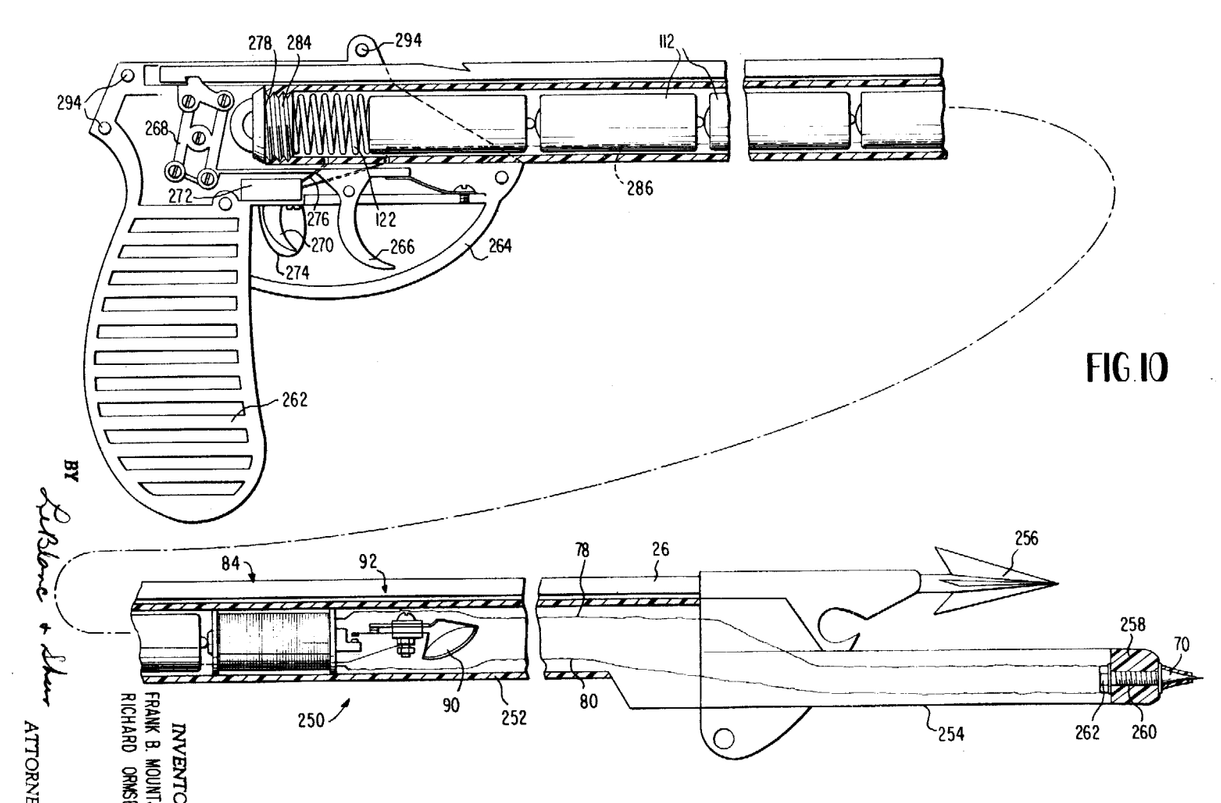
FIGURE 10 is an elevational view, with parts in section, showing the fish repeller as incorporated directly into the body of a modified spear gun.

FIGURE 10 shows the entire unit including the power supply elements incorporated in a spear gun generally indicated as 250. The gun comprises a tubular housing or casing 252 upon which rests the spear 26. It includes an integral forwardly projecting portion 254 beneath the spear tip 256 at the end of which are mounted the electrodes 70 and 72 which operate in the manner previously described. The end of the tubular casing is closed off by a sealing plug 258. The shanks of the electrodes are threaded as at 260 and secured to the plugs 258 by nuts such as that indicated at 262. The electrically insulating plug may be adhesively secured or otherwise sealingly attached to the end of the hollow projecting portion 254 of the casing. Again, the casing is made of plastic or other suitable corrosion resistant insulating material so as to withstand the effects of the water to which it is subjected.

Within the hollow casing 252 are the dry cell batteries 112 forming the power supply for the spark coil transformer 84. Capacitor 90 and vibrator 92 likewise are incorporated within the shank of the spear gun. Coupling to the penetrating electrodes as before is by way of leads 78 and 80 passing through the interior of the casing 252.

Figure 11:
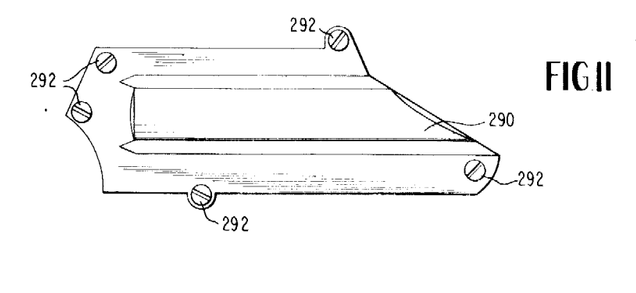
FIGURE 11 shows the removable mounting plate attached to the spear gun of FIGURE 10 and providing access to the power supply batteries incorporated in the gun.

It will be noted in FIGURE 10 that no relay is required since triggering is not remote from the power supply but directly adjacent the handle 262 of the spear gun in which the batteries are mounted. The gun is provided with a conventional trigger guard 264, trigger 266, and trigger actuating mechanism, part of which is indicated at 268 for propelling the spear 26. Within the trigger guard 264, and adjacent spear trigger 266 is a switch lever or auxiliary trigger 270. This trigger actuates switch 272 in the same manner as the switch 224 of FIGURE 8 and the switch lever is similarly completely enclosed in the flexible seal tight rubber envelope 274. Connection from the switch 272 to the power supply is by way of lead 276 which is soldered or otherwise suitably connected to the spring 122. This spring is compressed between the terminal of the end most of the dry cells 112 and an electrically insulating plug 278 mounted within the spear gun. The casing 252 of the spear gun is preferably provided with an internal shoulder at 284, internally threaded to receive the plug 278. Lead 286 connects the other terminal of switch 272 directly to the vibrator 92. This lead is illustrated as extending internally of the casing 252 along side of the dry cells 112 and past the transformer 84. Closure of switch 272 completes the circuit from the power supply through capacitor 90 and vibrator 72 to the primary of the transformer in a manner illustrated in FIGURE 12 to directly energize the output leads 78, 80, and hence, the sharpened electrodes penetrating the fish. Access to replace the batteries is provided by the removable cover plate 290, illustrated in FIGURE 11, which is attached by screws 292 threaded into apertures 294, formed in the spear gun casing and integral handle.

It is apparent from the above, that the present invention provides an improved device for warding off dangerous fish and particularly sharks. While usable in conjunction with boating and life saving situations, such as by those marooned for a long period of time on a rubber raft or the like, the unit of the present invention is particularly suited for use by skin divers and scuba divers when spear fishing. It is well known that when fish are pierced by the spear, they tend to bleed substantially and this may very well attract sharks and the like who may be warded off by the shocking device of the present invention.

As will be noted, the unit is designed so that the electrodes project several inches beyond the tip of the spear when the spear gun is loaded. Thus, the device of the present invention is usable even with a loaded spear gun and when incorporated on the end of the spear gun, helps maintain a substantial distance between the scuba diver and the fish. The particular number of batteries and other circuit components can be chosen in accordance with the desirable shock to be applied to the animals. This is preferably chosen to be sufficiently large so as to drive off even the largest species but is not intended to be so great as to kill the fish.

Inadvertent actuation of the auxiliary trigger or switch when the unit is not embedded in a fish, is not harmful since current simply flows through the water between the closely adjacent electrodes. However, an important feature of the present invention is the provision of an insulating coating down almost to the tips of the electrodes so that once the electrodes are embedded in the fish, the water does not short out the elecrical current but substantially all of the current flows through the fish to give him a substantial shock. The device is normally used with a loaded spear gun. To avoid severely wounding the fish and attracting others, the spear is used only as a last resort. The sharpened electrodes may be covered by a removable cap when the device is not in use.

What is claimed is:

1. A device for repelling dangerous animals and fish comprising a pair of closely spaced sharpened electrodes, and a battery operated electrical circuit coupled to said electrodes for producing a high voltage electrical discharge across their ends, said electrodes having an outer layer of electrical insulating material covering the sharpened portion of each electrode almost down to its tip.

2. A device according to claim 1 wherein said layer extends at least to within 1/8 of an inch of each tip.

3. A device according to claim 2 wherein said layer extends to about 1/32 of an inch from the tip of each electrode.

4. A device according to claim 1 including a housing, said electrodes projecting from one end of said housing, means for attaching said housing to the end of a spear gun, and means coupled to said electrodes for energizing said electrodes from a location remote from said housing.

5. A device according to claim 4 wherein said energizing means comprises a switch for mounting on the handle of a spear gun, and an electrical cable coupling said switch to said housing.

6. A device according to claim 5 including a power supply unit, means for mounting said power supply unit on the gear of an underwater swimmer, and a flexible power cable coupling said power supply unit to said switch.

7. A device for repelling fish comprising a pair of closely spaced sharpened electrodes for penetrating a fish without drawing substantial amounts of blood, said electrodes having an insulating coating almost down to their tips whereby at least part of the coated portion of said electrodes penetrate the fish, a water tight housing, a battery operated electrical circuit mounted in said housing and coupled to said electrodes for producing a high voltage discharge across said electrodes, a switch coupled to said circuit for energizing said electrodes, said switch including a switch actuator and a flexible sealing cup surrounding said switch actuator.

8. A device according to claim 7 wherein said switch is mounted on the handle of a spear gun and coupled to said housing by a cable.

9. A device according to claim 7 wherein said switch is mounted on said housing, and means for coupling a handle to said housing to form a hand-held pistol-like device.

10. A device according to claim 7 wherein said housing is formed integral with a spear gun, and said switch is mounted on said spear gun.

11. A device according to claim 7 wherein said electrodes are mounted on the end of a spear gun, and project beyond the tip of a spear when said gun is loaded.

12. A device for repelling fish comprising a spear gun, means for mounting a spear on said gun, and an electrical shocking unit at least partly carried by said spear gun, said electrical shocking unit including a pair of spaced electrodes mounted on said gun and projecting beyond the tip of a spear when said gun is loaded.

13. A device according to claim 12 wherein said electrodes are made of conductive metal having a diameter of approximately 1/4 inch, said electrodes including sharpened ends, and a coating of insulating material on said electrodes and extending over a substantial portion of said sharpened ends whereby only the tips of said electrodes are bare metal.

14. An electrical shocking device for repelling fish comprising a water tight repeller unit, a pair of closely spaced sharpened electrodes projecting from said repeller unit for penetrating a fish without drawing substantial amounts of blood, said electrodes having an insulating coating to at least 1/8 of an inch from their tips, a switch for mounting on the handle of a spear gun, a cable coupling said switch to said repeller unit, said switch including an actuator surrounded by a water tight flexible seal, a water tight power supply unit, means on said power supply unit for attaching it to the gear of an underwater swimmer and a flexible power cable coupling said power supply unit to said switch.

15. A device according too claim 14 including a mounting block on said repeller unit, and tongue and groove connecting means cooperating with said mounting block for attaching said repeller unit to the end of a spear gun.

16. A device according to claim 14 wherein said power supply unit includes means for housing a battery, a step up transformer for increasing the output voltage from said battery, a capacitor and mechanical vibrator coupled to said primary of said transformer for interrupting the output from said battery, a pair of output leads coupled to the secondary of said transformer, and a relay for controlling the signal from said battery to said output leads.

17. A repeller unit for an underwater shocking device comprising a water tight housing, a pair of closely spaced sharpened electrodes projecting from one end of said housing for penetrating a fish without drawing substantial amounts of blood, said electrodes having an insulating covering over a substantial part of their sharpened portions so that only the tips are bare, a mounting block on said housing, said mounting block including means for attaching said housing to either a spear gun or a gun-type handle, a switch in said housing for controlling the electrical energy to said electrodes, and a water tight plug on said housing for connecting said electrodes to a power supply.

References Cited
UNITED STATES PATENTS

| | | | |
|---|---|---|---|
| 2,253,315 | 8/1941 | Andrus. | |
| 2,892,585 | 6/1959 | Gilmore. | |
| 2,981,465 | 4/1961 | Bartel | 317—262 XR |
| 2,997,998 | 8/1961 | Traise | 43—6 XR |

J. D. TRAMMELL, Primary Examiner

W. M. SHOOP, JR., Assistant Examiner

U.S. Cl. X.R.

43—6, 17.1; 124—22